United States Patent [19]
McLeod

[11] Patent Number: 6,106,050
[45] Date of Patent: Aug. 22, 2000

[54] MULTI-PURPOSE TRUCK OR TRAILER BED COVER

[76] Inventor: Mike D McLeod, P.O. Box 1439, Willis, Tex. 77378

[21] Appl. No.: 09/378,825

[22] Filed: Aug. 23, 1999

[51] Int. Cl.[7] ............................. B62D 38/027; B60P 7/02
[52] U.S. Cl. ................................. 296/100.06; 296/26.06; 296/32
[58] Field of Search .................................. 296/32, 26.05, 296/26.06, 100.06

[56] References Cited

U.S. PATENT DOCUMENTS

| | | | |
|---|---|---|---|
| 1,023,617 | 1/1912 | Botteese | 296/32 |
| 2,711,342 | 6/1955 | Selzer | 296/32 |
| 2,993,727 | 7/1961 | Zewiske | 296/32 |
| 4,531,775 | 7/1985 | Beals | 296/100.06 |
| 5,009,457 | 4/1991 | Hall. | |

*Primary Examiner*—D. Glenn Dayoan
*Assistant Examiner*—Paul Chenevert
*Attorney, Agent, or Firm*—R. Perry McConnell

[57] ABSTRACT

The invention is a multi-purpose truck or trailer bed cover which provides protection and security for items stored in the bed, and is openable to provide a vertical extension of the bed. In the open configuration, the cover provides support and protection for large or tall cargo which cannot be carried with conventional single-piece bed covers. In the closed configuration, the cover provides an additional cargo deck.

14 Claims, 3 Drawing Sheets

MULTI-PURPOSE TRUCK OR TRAILER BED COVER

BACKGROUND OF THE INVENTION (1) Field of the Invention

The invention concerns covers for truck or trailer beds which provide improved flexibility for carrying large loads or other use of the bed area.

(2) Description of the Related Art

Bed covers for truck or trailer beds are available which provide protection from the elements for objects stored or carried in the bed. These covers sometimes also provide protection against theft by providing a lock mechanism to secure the cover in a closed position. However, these covers are often single-piece flat units which cannot be raised to a steep angle, and which thus prevent the transportation of large or tall items. Because these covers cannot be easily removed, they permanently limit the cargo carrying capacity of the truck or trailer beds on which they are installed.

Some variations of bed covers have allowed somewhat greater flexibility in carrying cargo. U.S. Pat. No. 4,531,775 to Beals discloses a security cover for a pickup truck bed which comprises two panels split down the center of the bed. These panels are mounted to the sides of the truck bed, and may be rotated to vertical positions aligned with the sides of the truck bed. However, the invention of Beals also requires a third panel to be mounted down the center of the bed to aid in supporting the panels when in the closed position. Thus, the third panel divides the bed while the cover is closed, and limits the size of objects which may be carried under the closed panels. This third panel may be moved into a position transverse to the bed between the front ends of the side panels when they are open to provide support to the side panels. However, even with the third panel used in this manner, the full area of the bed cannot be utilized until after the cover is opened and the third panel is moved into its transverse position. Further, the opened cover does not secure the area over the tailgate, and can thus require additional means of securing objects which might be carried above the tailgate level.

U.S. Pat. No. 5,009,457 to Hall discloses a pickup truck bed cover which primarily differs from that of Beals by not requiring a third supporting panel to be mounted vertically in the middle of the bed. However, the device disclosed by Hall provides only bar-like supports between the side panels, and thus does not provide support or protection from spillage at the front and rear ends of the bed.

U.S. Pat. No. 3,858,744 to Garvert discloses an openable bed cover and a means for supporting the cover in a variety of open positions. However, the device of Garvert also does not provide front or rear support for tall cargo, or protection against spillage for loose cargo.

Accordingly, it is desirable to provide a bed cover adaptable to truck or trailer beds which provides security for goods carried in the bed when the cover is closed, and which can be opened to extend the height of the bed while still providing support for cargo on all four sides and protecting against spillage of loose material which may be carried above the original bed height. It is also desirable to provide such a cover which will be easy to open and close for the average consumer.

BRIEF SUMMARY OF THE INVENTION

The invention is a truck or trailer bed cover which provides security for goods carried in the bed while the cover is closed and flexibility for carrying large loads or other uses of the bed area. The invention comprises two essentially flat cover panels, a first cover panel and a second cover panel, each of which is rotatably mounted to a longitudinal side wall of the bed. The cover panels can be lowered to a closed, essentially horizontal position in which they form a flat cover for the bed. In this closed position, one edge of each cover panel is substantially aligned over the longitudinal axis of the bed.

Because a truck or trailer bed with which this invention is used may be essentially square, rather than rectangular, it will be understood that "longitudinal axis of the bed," as used herein, means the centerline of the bed which is perpendicular to the front and rear of the bed. "Transverse axis of the bed," as used herein, means the centerline of the bed which is perpendicular to the sides of the bed. Similarly, the "longitudinal side walls of the bed" are those walls perpendicular to the front and rear of the bed, "longitudinal" is the direction parallel to the longitudinal side walls, and "transverse" is the direction perpendicular to the longitudinal side walls.

In the closed configuration, this invention provides security for goods carried in the bed under the cover, and an added platform for carrying goods on top of it. In the closed position, the seam between the adjacent edges of the first cover panel and the second cover panel is preferably watertight, so that the volume beneath the closed panels is protected from the elements by the panels. Further, a lock mechanism may be provided to lock the cover panels into their closed position relative to the vehicle bed, so that goods carried in the bed with the cover panels in their closed configuration can be protected against theft.

In the open position, each side panel can be positioned so that it forms an essentially vertical extension of the longitudinal side wall of the bed.

The invention also comprises a first end panel which is connectable to the cover panels, transverse to the cover panels at their front ends. This first end panel provides support for the first and second cover panels when they are in the open configuration, and also provides protection and support for cargo being carried in the bed. In the preferred embodiment, the first end panel comprises a first section and a second section which are joinable in an essentially planar configuration and which are each rotatably mounted to the front end a respective cover panel. These end panel sections are preferably foldable into recesses in their respective cover panels so that they do not take up any space in the cargo area of the bed when the cover panels are in the closed configuration.

The invention further comprises a second end panel which is connectable to the cover panels, transverse to the cover panels at their back ends. This second end panel has a similar function to the first end panel when the invention is in the open configuration. As with the first end panel, the second end panel preferably comprises a first section and a second section which are joinable in an essentially planar configuration. In the preferred embodiment, the first and second sections of the second end panel are mounted to pivot into essentially planar alignment with their respective cover panels and slide into recesses in those cover panels. If mounted in the preferred fashion, the first and section sections of the second end panel can remain stored while cargo is loaded into the bed area with the cover panels in their open, vertical configuration. Even if the bed area is filled, the first and second sections of the second end panel can then be slid from their storage recesses, pivoted transverse to the first and second cover panels, and connected into their open position.

It is a goal of the invention to provide a cover for a truck or trailer bed which provides an essentially vertical extension to the bed in its open configuration.

It is a further goal of the invention to provide a bed cover which allows maximum use of the cargo space in a truck or trailer bed in its closed configuration, while simultaneously providing security and protection from the elements.

It is another goal of the invention to provide a bed cover which provides a strong platform on which cargo can be carried in its closed configuration.

DETAILED DESCRIPTION OF THE INVENTION

Figure 1:
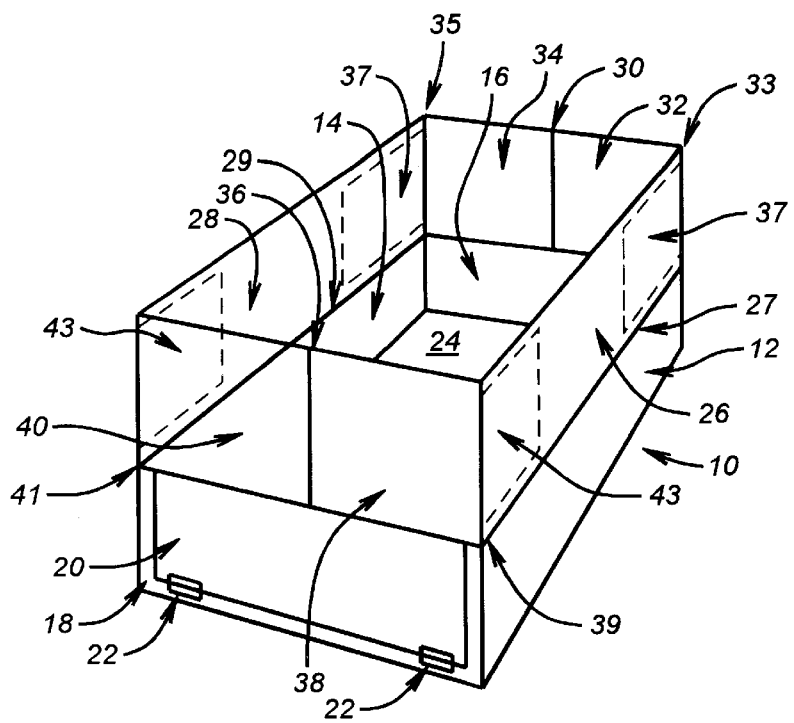
FIG. 1 is a perspective rear view of the invention in its open configuration on a vehicle bed.

Referring to FIG. 1, the invention is seen in perspective rear view in its open configuration on a vehicle bed, such as a truck or trailer bed. The cab portion of the vehicle and the undercarriage are not shown. As will be apparent to those familiar with truck and trailer beds, the invention will be easily adaptable to both truck and trailer beds because of the congruence of configuration of truck and trailer beds, and the description herein is intended to include both.

The vehicle bed 10 comprises a first longitudinal side wall 12, a second longitudinal side wall 14, a front wall 16, and a back wall 18, and a bottom 24. Often, especially in the case of truck beds, the back wall 18 comprises a tailgate 20 attached to the back wall by hinges 22. In its open configuration, the invention forms an essentially vertical extension of the vehicle bed 10. The invention comprises a first cover panel 26 which is rotationally mounted to the first longitudinal side wall 12 along edge 27. The invention also comprises a second cover panel 28 which is rotationally mounted to the second longitudinal side wall 14 along edge 29. Because a wide variety of rotational mounts, such as hinges, may be used to mount the first and second cover panels 26 and 28 to their respective longitudinal side walls 12 and 14, it is understood that the precise means of accomplishing this rotational mounting is not considered to be part of the invention. The only restriction on the method of rotational mounting is that the mount must allow the first and second cover panels 26 and 28 to rotate to a horizontal position so that they meet approximately over the longitudinal centerline of the vehicle bed 10, and to rotate into an essentially vertical position as depicted in FIG. 1. As will be apparent to those skilled in the art, the choice of designation of first and second longitudinal side walls and first and second cover panels is a matter of convenience only, and the designations may be interchanged without effect on the invention.

The invention also comprises a first end panel 30 and a second end panel 36. The first end panel 30 is preferably comprised of a first section 32 and a second section 34, which can be connected together in an essentially planar manner. The first end panel 30 is connectable to the first and second cover panels 26 and 28 at or near the front ends 33 and 35 of the first and second cover panels 26 and 28. As will be apparent to those skilled in the art, there are many practical means of connecting the first end panel 30 to the front ends 33 and 35 of the first and second cover panels 26 and 28, and the precise means of doing so is not considered a part of the invention. In the preferred embodiment, the first and second sections 32 and 34 of the first end panel 30 are rotatably connected to their respective cover panels by hinges which allow the first and second sections 32 and 34 of the first end panel 30 to rotate perpendicular to the first and second cover panels 26 and 28, as shown, and to rotate inward and parallel to the first and second cover panels 26 and 28, to fit into recesses 37 in the first and second cover panels 26 and 28. This preferred configuration will allow the first and second sections 32 and 34 of the first end panel 30 to be easily positioned into their transverse position when the invention is in its open configuration, and also easily stored out of the way when the invention is to be placed in its flat, closed configuration.

Those of skill in the art will recognize that some latching means, such as hasps, spring clips, or some other known latching means, will be necessary to connect the first and second sections 32 and 34 of the first end section together in an essentially planar configuration when the invention is the open configuration, and also to hold these sections into recesses 37 so that the first and second cover panels 26 and 28 may be lowered into the closed position without having the first and second sections 32 and 34 of the first end panel 30 fall downward into the cargo area of the vehicle bed 10. Because there are many available latching means and the choice of such will be a matter of size and weight of materials used and the experience of the person making the choice, the particular latching means used is not considered part of the invention.

Figure 1A:
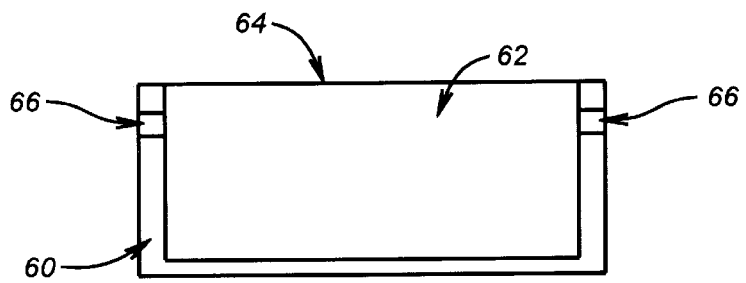
FIG. 1A is a sectional view of the front wall of the vehicle bed depicting an alternative embodiment of the mounting of the first end panel.

Those of skill in the art will also recognize that other methods of mounting the first end panel 30 can be used without disturbing the function of the invention. For example, referring to FIG. 1A, the first end panel 62 may be rotatably mounted to the front wall 60 of the vehicle bed by means of a hinge mounted along top edge 64 of the front wall 60. Alternatively, the first end panel 62 may be rotatably mounted to the first and second longitudinal side walls the vehicle bed (not shown) by means of mounting pins 66. In either of these alternative embodiments, the first end panel 62 may be rotated upward into its open configuration or downward into a position parallel and close to the front wall 60. This type of rotational mounting would allow the first end panel 62 to be quickly swung into position in the open configuration, and to be stored in the closed configuration without consuming a large amount of space in the vehicle bed.

Figure 1B:
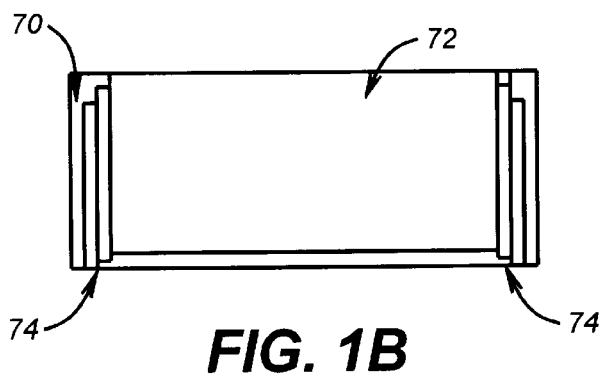
FIG. 1B is a sectional view of the front wall of the vehicle bed depicting an alternative embodiment of the mounting of the first end panel.

Alternatively, referring to FIG. 1B, the first end panel 72 may be placed on a vertical slide mount 74 attached to the front wall 70 of the vehicle bed, or to the floor of the vehicle bed (not shown). Such a slide mount 74 could allow the first end panel to be vertically raised into position to be connected to the first and second cover panels (not shown) in the open position, and stored in the closed configuration without occupying much space in the vehicle bed.

The invention also comprises a second end panel 36, which may be mounted in the open configuration transverse to the first and second cover panels 26 and 28 and connected to the first and second cover panels 26 and 28 at or near their back ends 39 and 41. As with the first end panel 30, there are a wide variety of connection means which may be implemented to attach the second end panel 36 to the first and second cover panels 26 and 28, and those of skill in the art will recognize that the particular selection of connection means is not part of the invention. In the preferred embodiment, the second end panel 36 comprises a first section 38 and a second section 40, which are connectable together in an essentially planar manner. Also in the preferred embodiment, the first and second sections of the second end panel 36 are rotatably and slideably mounted to the first and second cover panels 26 and 28 so that they may be rotated backward until they are parallel to the first and second cover panels 26 and 28 and then slid forward into recesses 43. In this preferred embodiment, the first and second sections 38 and 40 of the second end panel 36 may remain recessed in the open configuration until the vehicle bed is fully loaded, then pulled backward from their respective recesses 43, rotated inward, and connected together to complete the open configuration of the invention.

In the preferred embodiment, the first and second cover panels 26 and 28, and the first and second end panels 30 and 36 are fabricated from strong materials to provide strength and support to the structure. Those of skill in the art will recognize that additional bracing (not shown) internal to these panels may be useful in providing the desired strength of the panels.

Figure 2:
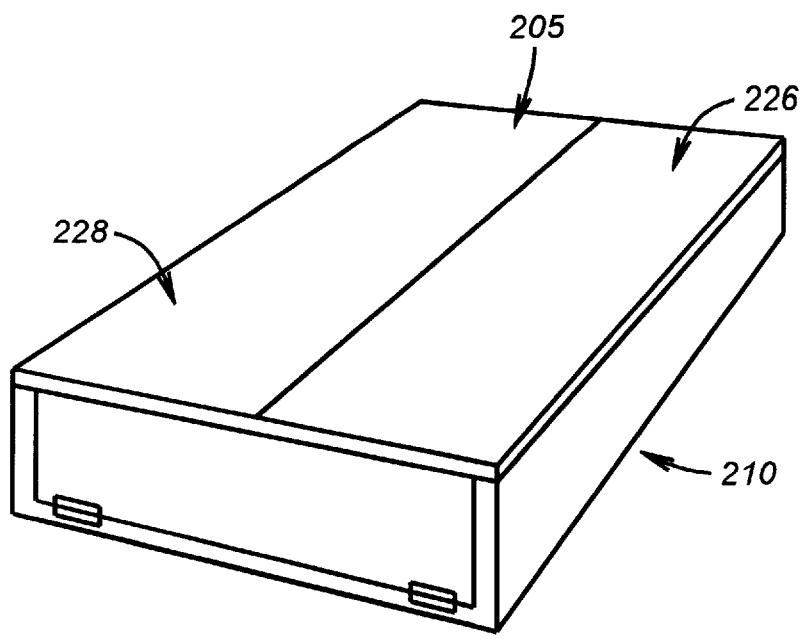
FIG. 2 is a perspective view of the invention in its closed configuration on a vehicle bed.

Referring to FIG. 2, the invention is shown in its closed configuration. The vehicle bed 210 is covered by the first cover section 226 and the second cover section 228. The first and second cover sections 226 and 226 meet essentially over the longitudinal centerline of the vehicle bed 210 providing a complete cover for the vehicle bed 210. The upper surface 205 of the invention provides an essentially flat deck which can be used to carry additional cargo.

Figure 3:
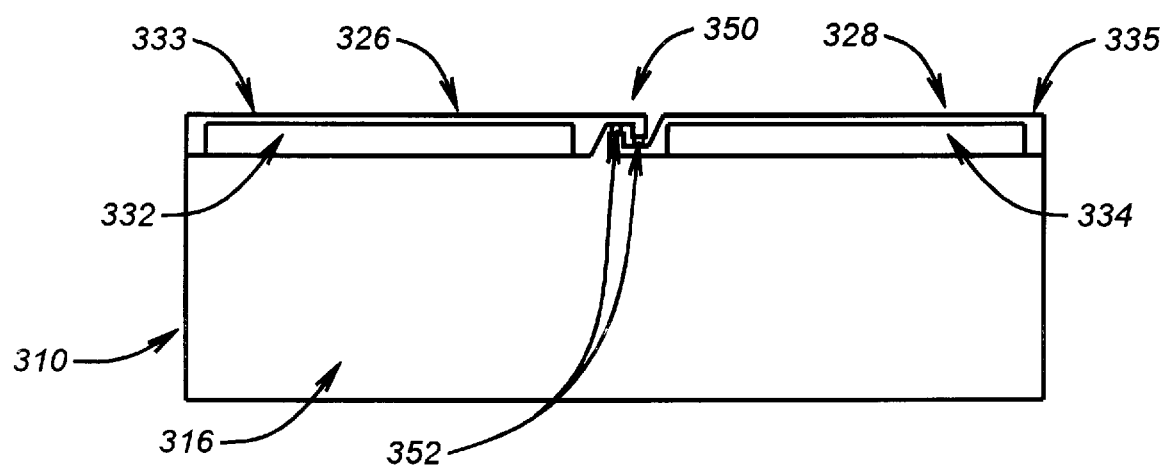
FIG. 3 is an edge view of an embodiment the invention in its closed configuration on a vehicle bed.

Referring to FIG. 3, one embodiment of the invention in its closed configuration on a vehicle bed is shown. The front wall 316 of the vehicle bed supports the front ends 333 and 335 of the first and second cover panels 326 and 328. The first and second end panel sections 332 and 334 are shown in their preferred, recessed, closed position. A tongue-and-groove join 350 provides protection against leakage, so that items in the vehicle bed 310 are protected from exposure to the elements. Weatherstripping 352 may also be used to provide further security against leakage.

Figure 4:
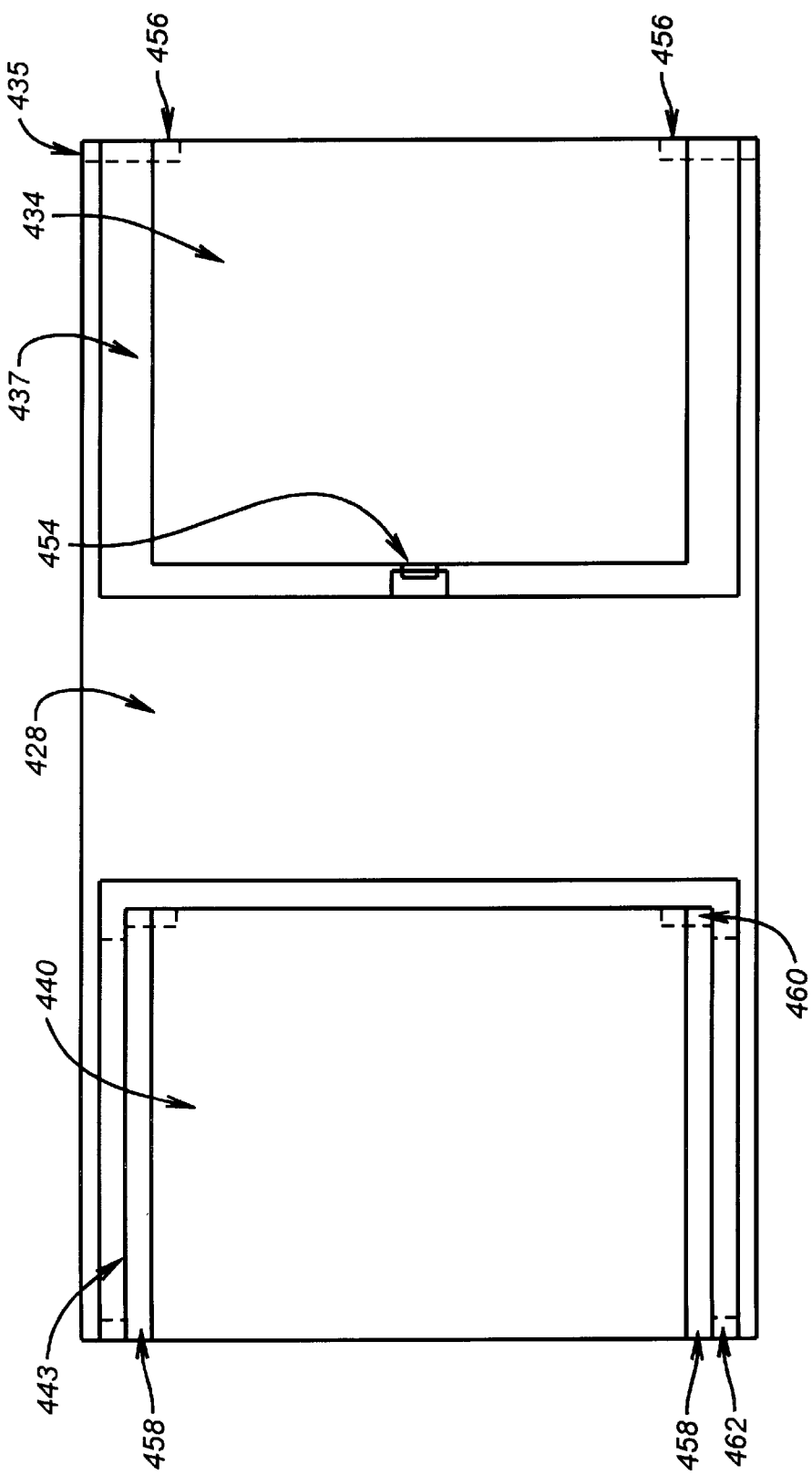
FIG. 4 is a bottom view of a cover panel of the preferred embodiment.

Referring to FIG. 4 the bottom view of the preferred embodiment of a cover panel 428 is shown. A section 434 of the first end panel (not shown) is set in recess 437. The section 434 is retained in the recess by means of a spring clip 454 and hinge pins 456 at the front end 435 of the cover panel 428. When the cover panel 428 is raised vertically into the open position, releasing the spring clip 454 will allow the section 434 to be rotated perpendicular to the cover panel 428 to be connected to its complementary section from the other cover panel.

A section 440 of the second end panel (not shown) is retained in recess 443. The section 440 is mounted on slide mounts 458. When the cover panel 428 is raised vertically into the open position, section 440 may be pulled out of its recess 443 on slide mounts 458. When section 440 is fully extended, pin 460 can drop into slot 462, allowing section 440 to be rotated transverse to cover panel 448 and connected to its complementary section from the other cover panel.

I claim:

1. An openable cover for a truck or trailer bed having a first longitudinal side wall, a second longitudinal side wall, and a front wall, comprising:
    a first cover panel, having a front end and a back end, rotatably mounted to the first longitudinal side wall of the bed;
    a second cover panel, having a front end and a back end, rotatably mounted to the second longitudinal side wall of the bed;
    a first end panel section rotatably mounted to said front end of said first cover panel;
    a second end panel section rotatably mounted to said front end of said second cover panel, wherein said first and second end panel sections are joinable in an essentially planar configuration when said first and second cover panels are positioned essentially vertically;
    a third end panel section rotatably mounted to said back end of said first cover panel; and
    a fourth end panel section rotatably mounted to said back end of said second cover panel, wherein said third and fourth end panel sections are joinable in an essentially planar configuration when said first and second cover panels are positioned essentially vertically,
    and wherein said first and second cover panels and said first, second, third, and fourth end panel sections may be positioned and connected to form an essentially rigid vertical extension of the truck or trailer bed.

2. The openable cover for a truck or trailer bed of claim 1, wherein said third end panel section is slideably mounted to said first cover panel.

3. The openable cover for a truck or trailer bed of claim 1, wherein said fourth end panel section is slideably mounted to said second cover panel.

4. An openable cover for a truck or trailer bed having a first longitudinal side wall, a second longitudinal side wall, and a front wall, comprising:
    a first cover panel, having a front end and a back end, rotatably mounted to the first longitudinal side wall of the bed;
    a second cover panel, having a front end and a back end, rotatably mounted to the second longitudinal side wall of the bed;
    a first end panel selectively rigidly positionable transversely between said front ends of said first and second cover panels when said first and second cover panels are positioned essentially vertically; and
    a second end panel selectively rigidly positionable transversely between said back ends of said first and second cover panels when said first and second cover panels are positioned essentially vertically,
    wherein said first and second cover panels and said first and second end panels may be connected and positioned to form an essentially rigid vertical extension of the truck or trailer bed, and wherein said first end panel comprises a first section and a second section which are joinable together in an essentially planar fashion.

5. The openable cover for a truck or trailer bed of claim 4, wherein said first section of said first end panel is rotatably mounted to said front end of said first cover panel.

6. The openable cover for a truck or trailer bed of claim 4, wherein said second section of said first end panel is rotatably mounted to said front end of said second cover panel.

7. The openable cover for a truck or trailer bed of claim 4, wherein said first section of said first end panel is recessible into said first cover panel.

8. The openable cover for a truck or trailer bed of claim 4, wherein said second section of said first end panel is recessible into said second cover panel.

9. An openable cover for a truck or trailer bed having a first longitudinal side wall, a second longitudinal side wall, and a front wall, comprising:
- a first cover panel, having a front end and a back end, rotatably mounted to the first longitudinal side wall of the bed;
- a second cover panel, having a front end and a back end, rotatably mounted to the second longitudinal side wall of the bed;
- a first end panel selectively rigidly positionable transversely between said front ends of said first and second cover panels when said first and second cover panels are positioned essentially vertically; and
- a second end panel selectively rigidly positionable transversely between said back ends of said first and second cover panels when said first and second cover panels are positioned essentially vertically, wherein said first and second cover panels and said first and second end panels may be connected and positioned to form an essentially rigid vertical extension of the truck or trailer bed, and wherein said second end panel comprises a first section and a second section which are joinable together in an essentially planar fashion.

10. The openable cover for a truck or trailer bed of claim 9, wherein said first section of said second end panel is rotatably mounted to said back end of said first cover panel.

11. The openable cover for a truck or trailer bed of claim 9, wherein said second section of said second end panel is rotatably mounted to said back end of said second cover panel.

12. The openable cover for a truck or trailer bed of claim 9, wherein said first section of said second end panel is slideably mounted to said first cover panel.

13. The openable cover for a truck or trailer bed of claim 9, wherein said second section of said second end panel is slideably mounted to said second cover panel.

14. An openable cover for a truck or trailer bed having a first longitudinal side wall, a second longitudinal side wall, and a front wall, comprising:
- a first cover panel, having a front end and a back end, rotatably mounted to the first longitudinal side wall of the bed;
- a second cover panel, having a front end and a back end, rotatably mounted to the second longitudinal side wall of the bed;
- a first end panel selectively rigidly positionable transversely between said front ends of said first and second cover panels when said first and second cover panels are positioned essentially vertically; and
- a second end panel selectively rigidly positionable transversely between said back ends of said first and second cover panels when said first and second cover panels are positioned essentially vertically, wherein said first and second cover panels and said first and second end panels may be connected and positioned to form an essentially rigid vertical extension of the truck or trailer bed, and wherein said first end panel is slideably mounted to the bed.

* * * * *